(12) United States Patent
Yakoel et al.

(10) Patent No.: US 11,676,163 B1
(45) Date of Patent: Jun. 13, 2023

(54) SYSTEM AND METHOD FOR DETERMINING A LIKELIHOOD OF A PROSPECTIVE CLIENT TO CONDUCT A REAL ESTATE TRANSACTION

(71) Applicant: ROSETAL SYSTEM INFORMATION LTD., Tel Aviv (IL)

(72) Inventors: Erez Yakoel, Kidron (IL); Asaf Rubin, Herev Iaet (IL)

(73) Assignee: ROSETAL SYSTEM INFORMATION LTD., Tel Aviv (IL)

( * ) Notice: Subject to any disclaimer, the term of this patent is extended or adjusted under 35 U.S.C. 154(b) by 0 days.

(21) Appl. No.: 17/893,911

(22) Filed: Aug. 23, 2022

(51) Int. Cl.
| | |
|---|---|
| *G06Q 30/02* | (2023.01) |
| *G06Q 30/06* | (2023.01) |
| *G06Q 50/16* | (2012.01) |
| *G06Q 40/08* | (2012.01) |
| *G06Q 50/18* | (2012.01) |
| *G06Q 30/0204* | (2023.01) |
| *G06Q 30/0645* | (2023.01) |
| *G06Q 40/03* | (2023.01) |

(52) U.S. Cl.
CPC ..... *G06Q 30/0204* (2013.01); *G06Q 30/0645* (2013.01); *G06Q 40/03* (2023.01); *G06Q 40/08* (2013.01); *G06Q 50/16* (2013.01); *G06Q 50/18* (2013.01)

(58) Field of Classification Search
CPC . G06Q 30/0204; G06Q 30/0645; G06Q 50/16
USPC .......................................................... 705/4
See application file for complete search history.

(56) References Cited

U.S. PATENT DOCUMENTS

| | | | | |
|---|---|---|---|---|
| 2016/0055576 | A1* | 2/2016 | Reddy | G06Q 30/0645 705/80 |
| 2016/0093007 | A1* | 3/2016 | Richardson | G06Q 30/0611 705/26.4 |
| 2016/0189210 | A1* | 6/2016 | Lacey | G06Q 10/067 705/7.31 |
| 2019/0102802 | A1* | 4/2019 | Tuschman | G06N 20/20 |
| 2021/0312493 | A1* | 10/2021 | Taylor | G06N 3/04 |
| 2022/0012763 | A1* | 1/2022 | Sharma | G06N 3/048 |

\* cited by examiner

*Primary Examiner* — Robert R Niquette
(74) *Attorney, Agent, or Firm* — The Roy Gross Law Firm, LLC; Roy Gross

(57) ABSTRACT

Disclosed are a computer implemented method and system for determining a likelihood of a prospective client to engage in a real estate transaction, by obtaining and/or retrieving one or more characteristics of the prospective client; extracting data regarding a digital interaction behavior of the prospective client; deriving from the retrieved/extracted data one or more digital interaction features of the prospective client directly or indirectly associated with real estate, applying a machine learning algorithm on the derived one or more digital interaction features and on the prospective client's characteristics to determine a probability, a range of probabilities or a category of likelihood of the prospective client to engage in the real-estate transaction.

22 Claims, 4 Drawing Sheets

SYSTEM AND METHOD FOR DETERMINING A LIKELIHOOD OF A PROSPECTIVE CLIENT TO CONDUCT A REAL ESTATE TRANSACTION

FIELD OF THE INVENTION

Embodiments of the disclosure relate to the capability to predict the likelihood of a prospective client to conduct a real estate transaction, in particular to machine learning algorithm-based computational methods for determining a probability, a range of probabilities or a category of likelihood of a prospective client to engage in a real-estate transaction.

BACKGROUND

Currently, real-estate agents receive a multiplicity of leads regarding prospective clients. However, due to the large number of leads, the agents are typically unable to approach each of them and many of the leads remain unanswered.

Moreover, real-estate agents are typically unable to up-front predict whether or not a particular lead is likely to engage in a transaction.

There is therefore a need for a system and method capable of reliably predicting the probability of a prospective client to conduct a real-estate transaction.

SUMMARY OF THE EMBODIMENTS

According to some embodiments, there is provided a computer implemented method and/or platform for determining a probability, a range of probabilities or a category of likelihood of a prospective client to engage in a real-estate transaction.

Advantageously, the herein disclosed method and system applies AI models, such as, but not limited to, natural language processing (NLP) and machine learning (ML), on a subject's digital behavior data and features extracted therefrom, based upon which a likelihood of transaction can be determined.

As a further advantage, by predicting the likelihood of transaction, the herein disclosed platform and method enables one to classify prospective clients, according to their probability to transact and/or their readiness for engaging in a real-estate transaction, according to the type of client, as further elaborated below, which in turn may serve as an AI-directed decision assisting tool for agents regarding which leads are the most beneficial to pursue.

Furthermore, the herein disclosed platform and computer implemented method advantageously enables identifying prospective clients, which require additional services (such as mortgages, insurance and the like).

Importantly, these advantages are achieved in an automated fashion requiring little, if any, human intervention.

There is provided herein, in accordance with some embodiments, a computer implemented method for determining a likelihood that a prospective client will engage in a real estate transaction, the method comprising:
  obtaining and/or identifying a prospective client;
  obtaining and/or retrieving one or more characteristics of the prospective client;
  extracting data regarding a digital interaction behavior of the prospective client;
  deriving from the retrieved/extracted data one or more digital interaction features of the prospective client, said one or more digital interaction features is directly or indirectly associated with real estate;
  applying a machine learning algorithm on the derived one or more digital interaction features and on the prospective client's characteristics to determine a probability, a range of probabilities or a category of likelihood of the prospective client to engage in the real-estate transaction,
  wherein the machine learning algorithm is trained using a training dataset comprising digital interaction features and user characteristics of a population of prospective clients and labels associated with each member of the population, the labels indicating whether the member engaged in a transaction; and
  providing an output indicative of the determined probability, range of probabilities or category of likelihood of the prospective client to engage in the real-estate transaction.

According to some embodiments, engaging in the real-estate transaction comprises conducting the real-estate transaction.

According to some embodiments, the method further comprises calculating the likelihood to engage in the transaction at a certain point in time or to calculate the point in time when a specific likelihood to engage in the real-estate transaction is reached.

According to some embodiments, the prospective client is a subject visiting, entering and/or communicating with a virtual real estate platform.

According to some embodiments, the method further comprises initiating an interaction with the prospective client and wherein the obtaining and/or retrieving data regarding the digital interaction behavior of the prospective client comprises extracting the data regarding the digital interaction behavior from the initiated interaction.

According to some embodiments, the method further comprises periodically interacting with the prospective client and updating the extracted data based on periodic interaction.

According to some embodiments, the digital interaction comprises browsing, texting, voice messaging, image messaging, multimedia messaging, bot conversations, comments and/or responses to checked property listings, video clips watching, voice calls, video calls or any combination thereof.

According to some embodiments, the method further comprises assigning to the prospective client one or more clusters created by a machine learning algorithm trained on the full population and on digital behaviors thereof.

According to some embodiments, the method further comprises using the correlations in a regression-based determination to predict for the particular prospective client the probability, the range of probabilities or the category of likelihood, of the particular prospective client engaging in the real-estate transaction.

According to some embodiments, the extracting comprising applying voice analysis, text analysis, voice to text transcription and analysis thereof, sentiment analysis or any combination thereof.

According to some embodiments, the at least one digital interaction feature is selected from an amount of time spent browsing, a degree to which the browsing was an in-depth browsing, a quantity of property listings checked, a degree of similarity between the properties checked, a degree of consistency between the property listings checked and a set of preferences investigated by the prospective client, a level of responsiveness by the prospective client to conversational bots, text/multimedia/voice messages, voice calls and/or push notifications, a timing of the prospective client's response to conversational bots, text/multimedia/voice messages, voice calls and/or push notifications, a listing checking rate, a realistic expectations index, a level of action-taking related to a potential real estate transaction, an amount of people involved by the prospective client with regards to the property listing, an amount of sharing of the checked property listing or any combination thereof. Each possibility is a separate embodiment.

According to some embodiments, the one or more characteristics of the prospective client comprise at least one of the following: one or more life circumstances driving the decision to visit/enter the virtual real estate platform, age, gender/affiliation, family status, employment status, socio-economic status, current housing status, geographic location, demographic status, mortgage pre-approval, financial status, financial proof provided, and previous transactions.

According to some embodiments, the method further comprises matching an agency or agent to the prospective client based on the probability, the range of probabilities or the category of likelihood and a type of the client.

According to some embodiments, the method further comprises assigning a particular agent to the prospective client based on the derived one or more digital interaction features and/or on the probability, the range of probabilities or the category of likelihood of the prospective client to engage in the real-estate transaction.

According to some embodiments, the real estate transaction comprises buying/selling of a property, renting/leasing a property and/or financing a property. According to some embodiments, the output is a prediction that is specific to the type of real-estate transaction.

According to some embodiments, the method further comprises predicting the likelihood of the prospective client to acquire a real-estate related service, the service selected from legal service, insurance, renovation, moving, loan, mortgage, title escrow or any combination thereof.

According to some embodiments, the method further comprises predicting a suitable timing of a next interaction with the prospective client, based on the derived one or more digital interaction features and/or on the probability, the range of probabilities or the category of likelihood of the prospective client to engage in the real-estate transaction.

According to some embodiments, there is provided a system for creating an enriched property listing, the system comprising a processor configured to:
  obtain and/or identify a prospective client;
  obtain and/or retrieve one or more characteristics of the prospective client;
  extract data regarding a digital interaction behavior of the prospective client;
  derive from the retrieved/extracted data one or more digital interaction features of the prospective client, the one or more digital interaction features is directly or indirectly associated with real estate;
  apply a machine learning algorithm on the derived one or more digital interaction features and on the prospective client's characteristics to determine a probability, a range of probabilities or a category of likelihood of the prospective client to ultimately transact, wherein the machine learning algorithm is trained using a training dataset comprising digital interaction features and user characteristics of a population of prospective clients and labels associated with each member of the population, the labels indicating whether the member engaged in the real-estate transaction; and
  provide an output indicative of the determined probability, range of probabilities or category of likelihood of the prospective client to engage in the real-estate transaction.

BRIEF DESCRIPTION OF THE DRAWINGS

Some embodiments are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE EMBODIMENTS

Figure 1:
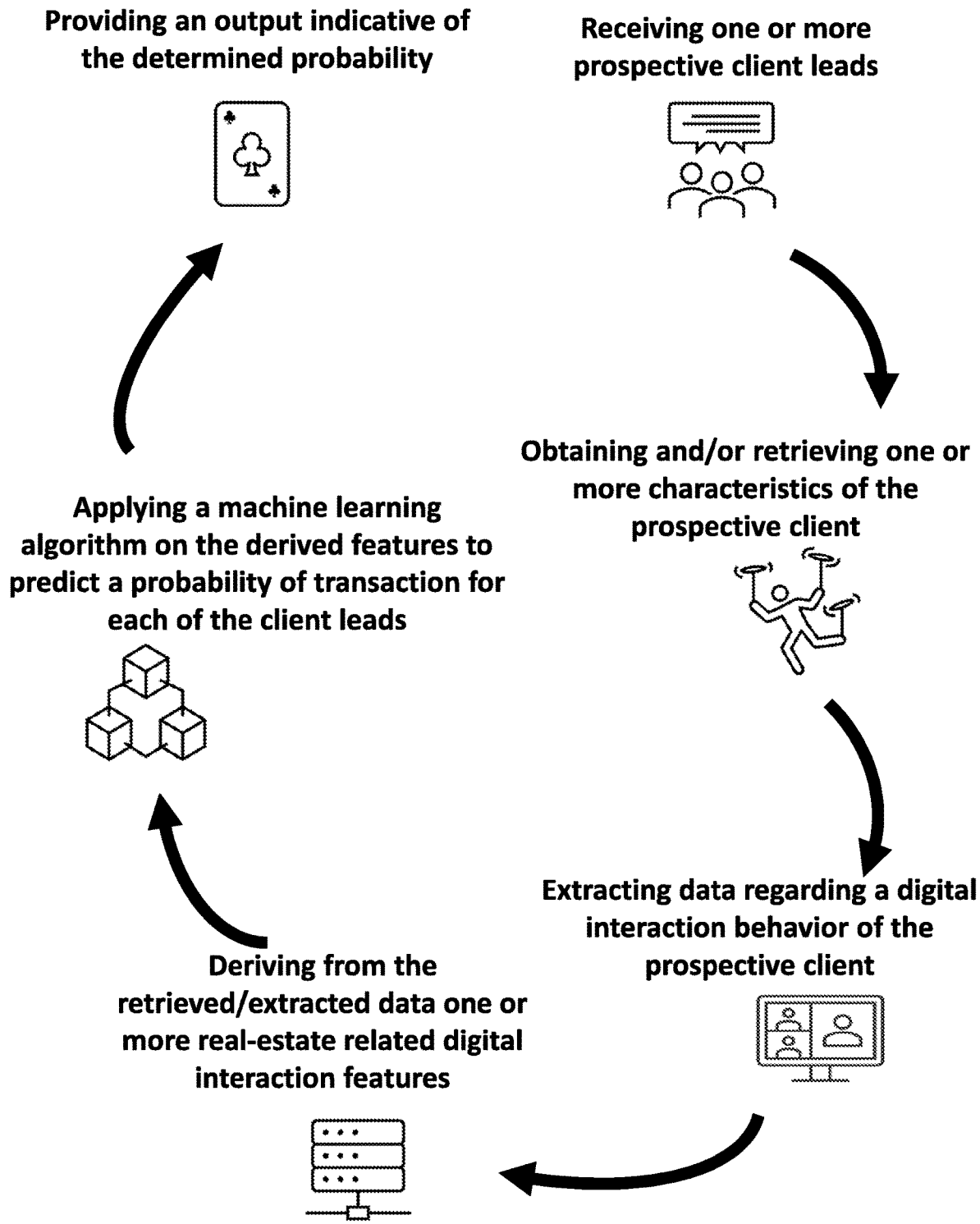
FIG. 1 schematically shows an outline of the herein disclosed AI-based platform for determining a transaction probability and/or engagement likelihood, according to some embodiments.

The following detailed description is of the best currently contemplated modes of carrying out the invention. The description is not to be taken in a limiting sense, but is made merely for the purpose of illustrating the general principles of the invention, since the scope of the invention is best defined by the appended claims.

According to some embodiments, there is provided a computer implemented method and/or platform for determining a likelihood that a prospective client will engaging in a real-estate transaction.

As used herein, the terms, "prospective client" and "lead" may be used interchangeably and may refer to any subject that has shown interest in conducting a real-estate transaction. According to some embodiments, the prospective client may be a subject that has visited, entered and/or communicated with a virtual real estate platform, such as, but not limited to, a real-estate website, a real-estate social media page, a real-estate chat-bot or the like. According to some embodiments, the prospective client may be a subject that has contacted a real-estate agent, optionally regarding a specific property listing.

As used herein, the terms "property listing" and "real estate listing" may be used interchangeably and may refer to any printed advertisement, internet posting, or publicly displayed sign of properties/real estate, which are available for purchasing and/or rent.

As used herein, the terms "real-estate property" and "property" may be used interchangeably and may refer to a single property or a project. Non-limiting examples of single properties include a house/home, an apartment, an office, a fabric, a storage, a land, a commercial building, an industrial property, an agricultural property, a mixed-use property and the like. Non-limiting examples of real-estate projects include a housing complex, a commercial area, a hotel, and the like.

As used herein the terms "real-estate transaction" and "transaction" may be used interchangeably and may refer to the buying/selling of a property or a part thereof, renting/leasing a property or a part thereof, house-swapping, financing a property or a part thereof and/or investing in a property or a part thereof, real-estate related service or any combination thereof. Each possibility is a separate embodiment.

As used herein, the term "real-estate related service" refers to any type of service and/or assistance that is connected to conducting a real-estate transaction, but which is not the real-estate transaction itself. Non-limiting examples of real-estate related services include legal service, pre-approval, insurance related service, renovation services, moving, loan, mortgage, title escrow or any combination thereof. Each possibility is a separate embodiment.

As used herein the term "engage in a real-estate transaction" refers to the readiness of a prospective client for a "next step" such as, being sent real-estate transaction material, engaging in a chat bot conversation, conducting a phone call with an agent, being shown a property, conducting a real-estate transaction, finalizing a real estate transaction and the like.

According to some embodiments, determining a likelihood that a prospective client will engage in a real-estate transaction comprises determining the likelihood that the prospective client will ultimately transact.

As used herein, the term "ultimately transact" may refer to the client conducting a real-estate transaction within half a year, within 3 months, within 2 months, within 1 month or within 2 weeks from the computing of the probability. Each possibility is a separate embodiment.

According to some embodiments, determining a likelihood that a prospective client will engage in a real-estate transaction comprises determining the likelihood over time (also referred to as a time-frame likelihood). As a non-limiting example, the computer implemented method may compute that a time-frame probability of engagement of 50% is likely to happen 15 days from an interaction, and a time-frame probability of engagement of 85% in 37 days from the interaction. According to some embodiments, based upon such calculations, time-points of interaction may be automatically set. According to some embodiments, the time-frame probability of engagement may be computed for a multiplicity of scenarios. As a non-limiting example, the computer implemented method may compute that a time-frame probability of engagement of 50% is likely to happen 12 days from an interaction, but that the probability of engagement within that timeframe will rise to 65% if a message is sent 7 days after the interaction. As another non-limiting example, the computer implemented method may compute that a time-frame probability of engagement of 50% is likely to happen 15 days from an interaction, and that the time-frame probability of engagement will rise to 80% in 40 days from the interaction provided a push-notification is sent in the intervening time-period. According to some embodiments, a probability may be computed for more than one transaction type. For example, a first probability may be computed regarding the likelihood that a prospective client will engage in a transaction that involves the buying of a property and a second probability regarding the likelihood that the prospective client will engage in a transaction that involves renting a property.

According to some embodiments, the system/method/platform is configured to obtain and/or retrieve one or more characteristics of the prospective client. According to some embodiments, the term "obtain" with regards to the one or more characteristics may refer to passively getting the characteristics, for example from a real-estate agent or directly from the prospective client (e.g. via a questionnaire or through a chat bot). According to some embodiments, the term "retrieve" with regards to the one or more characteristics may refer to actively recovering, collecting, downloading, saving in folders or otherwise gathering the characteristics, preferably from websites, emails, text messages, video clips or the like, for example, by automatically extracting data, from the internet (e.g., from social media profiles) using application program interfaces (API) and/or natural language processing (NLP) models.

According to some embodiments, the one or more characteristics may be selected from a life circumstance or change therein, age, gender or gender affiliation, family status, socioeconomic status, employment status, current housing status, geographic location, demographic status, mortgage pre-approval, financial status, financial proof provided, previous transactions or any combination thereof. Each possibility is a separate embodiment.

For example, certain life circumstances (e.g. a newborn child, a new job, relocation, loss/gain of money, child moving out) may be strong indicators of transaction likelihood.

According to some embodiments, the computer implemented method and/or platform is configured for extracting data regarding a digital interaction behavior of the prospective client.

As used herein, the term "digital interaction" may refer to browsing, texting, voice messaging, image messaging, multimedia messaging, bot conversations, comments and/or responses (e.g. to checked property listings), video clips watching, voice calls, video calls or any combination thereof. Each possibility is a separate embodiment.

As used herein, the term "digital interaction behavior" may refer to qualitative (e.g. content) and/or quantitative (e.g. duration) of the digital interaction.

As used herein, the term "extracting" with regards to data regarding a digital interaction behavior may refer to collecting, downloading, saving in folders or otherwise gathering digital interaction data. According to some embodiments, the digital interaction may be passively obtained (e.g. emails with the prospective client obtained from a real estate agent). Additionally or alternatively, the digital interaction may be an AI-mediated interaction, actively initiated with the prospective client, via the platform.

According to some embodiments, the digital interaction may be initiated preemptively. According to some embodiments, the digital interaction may be initiated before the computing/determining of the likelihood of the prospective client to conduct a real-estate transaction.

According to some embodiments, a follow-up interaction may be initiated periodically, e.g. twice a week, weekly, monthly, etc. According to some embodiments, a follow-up interaction may be initiated, based on the initially computed/determined likelihood of the prospective client to conduct a real-estate transaction.

According to some embodiments, the computed/determined likelihood of the prospective client to transact may be updated, based on the follow-up digital interaction.

According to some embodiments, the computer implemented method and/or platform is configured to predict a best timing of a next interaction-initiation, based on the derived one or more digital interaction features and/or on the probability, the range of probabilities or the category of likelihood of the prospective client to engage in a real-estate transaction, and optionally based on the response to a previously initiated interaction.

According to some embodiments, the computer implemented method and/or platform is configured to predict a best type of a next interaction-initiation, based on the derived one or more digital interaction features and/or on the probability, the range of probabilities or the category of likelihood of the prospective client to engage in a real-estate transaction, and optionally based on the response to a previously initiated interaction. Non-limiting examples of types of interactions comprise text message, voice message, video message, human interaction, etc.

According to some embodiments, the computer implemented method and/or platform is configured to predict the likelihood of transaction based on the type of interaction. For example. A first probability may be determined for an interaction involving texting and a different probability for an interaction involving human contact.

According to some embodiments, the computer implemented method and/or platform is configured for deriving, from the extracted data, one or more digital interaction behavior features of the prospective client, the one or more features being directly or indirectly associated with real estate.

According to some embodiments, the digital interaction features may be derived by applying feature selection and/or feature extraction algorithms on the extracted data. According to some embodiments, deriving the features comprises applying an NLP model on the extracted data. According to some embodiments, deriving the features comprises applying voice analysis, text analysis, voice to text transcription and analysis thereof, sentiment analysis or any combination thereof on the extracted data. Each possibility is a separate embodiment.

According to some embodiments, the text, voice and video analysis may take into account age, area, socioeconomic status and/or other variables that can influence the language and/or behavior of the prospective client. According to some embodiments, the computer implemented method and/or platform may be further configured to pre-categorize and/or cluster the prospective clients, based on one or more of the obtained/derived characteristics, such as, for example, geographic area, and the clustering may then serve as an input to the NLP models implemented. As a non-limiting example for the general population, the answer "cool" is a strong positive signal while for a specific prospect's cluster (e.g. based on geographic area) it may be a much less meaningful signal.

Various AI models may be applied on the data to derive features therefrom.

According to some embodiments, speech recognition/transcription models may be applied to audio recordings and/or audio messages to generate a transcribed text. Non-limiting examples of suitable transcription algorithms include AWS transcribe API, Speech-to-Text API, etc. Each possibility is a separate embodiment.

According to some embodiments, NLP models may be applied on text to retrieve specific information from the text, identify keywords or key points in the text and the like. According to some embodiments, the one or more NLP models may include one or more autoregressive language models. According to some embodiments, the one or more NLP may be selected from: Bidirectional Encoder Representations from Transformers (BERT), Robustly Optimized BERT Pretraining Approach (RoBERTa), GPT-3, ALBERT, XLNet, GPT2, StructBERT, Text-to-Text Transfer Transformer (T5), Efficiently Learning an Encoder that Classifies Token Replacements Accurately (ELECTRA), Decoding-enhanced BERT with disentangled attention (DeBERT) Dialog Flow, Spacy based models, or any combination thereof. Each possibility is a separate embodiment.

Non-limiting examples of features that may be extracted include: an amount of time spent browsing, a degree to which the browsing was an in-depth browsing (e.g. how much time is spent on a particular listing), a quantity of property listings checked, a degree of similarity between the properties checked, a degree of consistency between the property listings checked, preferences investigated by the prospective client, a level of responsiveness by the prospective client, for example, to conversational bots, text messages, multimedia messages, voice messages, voice calls, and/or push notifications, a timing of the prospective client's response to conversational bots, text/multimedia/voice messages, voice calls and/or push notifications (e.g. in terms of when in the day and/or in terms of also how fast the prospective client interacts after an interaction has been initiated) a listing checking rate, a realistic expectations index, a level of action-taking related to a potential real estate transaction, an amount of people involved by the prospective client with regards to the property listing (e.g. inviting a relative can be positive indication), an amount of sharing of the checked property listing, or any combination thereof. Each possibility is a separate embodiment.

According to some embodiments, the extracted data may include structured and/or unstructured feed.

As used herein, the term "structural feed" may refer to a feed that stores data in a predefined format, such as templates or forms, with patterns that make them easily searchable. Accordingly, deriving features from a structured feed may, according to some embodiments, require simple saving, duplicate removal, filtering and/or categorizing of data. A non-limiting example of a structured feed is a questionnaire.

According to some embodiments, the terms "unstructured feed", "non-structured feed", "unstructured data", "non-structured data", "unstructured data feed" and "non-structured data feed" may be used interchangeably and may refer to a feed that stores data in a manner that is usually not easily searchable, including formats such as, but not limited to: audio, video, social media postings, text messages and the like. Accordingly, retrieving data from an unstructured feed may, according to some embodiments, require more challenging analysis, including application of complex algorithmic models such as, but not limited to, machine learning models, natural language processing models, image analysis algorithms, speech recognition/transcription models and the like, in order to extract relevant features therefrom. Non-limiting examples of non-structured data feed is a social media post.

According to some embodiments, the computer implemented method and/or platform is configured for applying a machine learning algorithm on the one or more derived digital interaction features and on the retrieved client characteristics to determine a probability, a range of probabilities or a category of likelihood of the prospective client to engage in the real-estate transaction.

According to some embodiments, the machine learning algorithm may be trained using a training dataset comprising digital interaction features and user characteristics of a population of clients as well as labels associated with each member of the population of clients, the labels indicating whether or not the client engaged in the real-estate transaction. According to some embodiments, the machine learning algorithm may be subsequently validated on a validation dataset comprising digital interaction features and user characteristics of a second population of clients as well as labels associated with each member of the second population of clients, the labels indicating whether or not the client engaged in the transaction, the type of transaction, the time period between initial interaction and transaction and the like.

According to some embodiments, the computer implemented method and/or platform is configured for providing an output indicative of the determined probability, range of probabilities or category of likelihood of the prospective client to engage in a real-estate transaction. According to some embodiments, the output may be a text message, an icon, a color or other signal indicative of the probability. According to some embodiments, the output may be displayed on a display, such as a computer screen or a smartphone. According to some embodiments, the output may be in the form of a document, including a list of prospective clients, classified and optionally ranked according to their determined likelihood to conduct a real-estate transaction. According to some embodiments, the output may be a task and/or automated call for action, such as, but not limited to, a task to call the client, to send a push notification or the like. According to some embodiments, the task may be in the form of an automated calendar appointment (e.g. to call the client, to engage in a chat-bot conversation with the client, to send a message to the client and the like). According to some embodiments, the task may be an automated push-notification. According to some embodiments, the task and/or its timing may be personalized to the client (e.g. based on client type, as further elaborated below, a computed timeframe probability, type of transaction, etc.) According to some embodiments, the output may be in the form of a shortlist, listing only the prospective clients with a high likelihood to transact (e.g. above-average likelihood). According to some embodiments, the output may be user-modifiable, e.g. enable a user to filter, sort or otherwise present the output according to his/her preferences.

According to some embodiments, the computer implemented method and/or platform is further configured to classify the prospective client into one or more client classes/types/categories by applying a same or a different machine-learning algorithm on the derived features. Non-limiting examples of client types include the 'parent type', the 'party type', the 'culturally interested client', the 'avant-garde type', the 'luxury-type', the 'cost sensitive-type', the 'social type', 'the environmentally aware type', the 'privacy concerned type', the 'commuting type', the 'aggressive type', the 'polite type' etc. It is understood by one of ordinary skill in the art that a prospective client may be classified into more than one class.

According to some embodiments, the computer implemented method and/or platform is further configured to match a specific agency and/or to a specific agent (or agent type) to the prospective client, based on the classification of the prospective client, so as to maximize the likelihood of transaction. According to some embodiments, the probability, range of probabilities or category of likelihood of transaction computed/determined may be agency/agent specific. Advantageously matching the right agent to the client may increase the probability of transaction and/or reduce time to transaction. According to some embodiments, the output may include both a general and an agent specific probability.

According to some embodiments, the computer implemented method and/or platform is further configured to determine the likelihood that the prospective client will acquire a real-estate related service.

According to some embodiments, the computer implemented method and/or platform is further configured to suggest and/or assist the prospective client with acquiring the real-estate related service. As a non-limiting example, the output may include a link to a validated service provider. As another non-limiting example, the output may include a list of services that the prospective client is likely to acquire/need.

According to some embodiments, a prospective client's real-estate related actions may serve as input for the algorithm. For example, taking care of financials (such as start selling properties, securing cash, etc.) may be positive indicators of transaction likelihood.

Reference is now made to FIG. 1, which schematically shows an outline of the herein disclosed AI-based platform for determining a likelihood of a prospective client to conduct a real estate transaction, according to some embodiment.

Starting at the top right side of the figure, a prospective client or, more preferably, a plurality of leads regarding prospective clients (such as 10, 20, 50, 100 or more leads) may be obtained and/or retrieved. As stated herein, the leads may, for example, be obtained from a real-estate agent and/or retrieved from a dedicated real-estate website. The leads serve as an input to the platform.

The platform may then receive and/or retrieve one or more characteristics of the subject, such as age, employment, family status, etc. It is understood that at least a portion of the information may be inputted with the inputted lead. Additionally or alternatively, at least a portion of the information may be inputted by the prospective client him/herself, for example, in response to a questionnaire, a chat bot conversation and/or the like. Additionally or alternatively, at least a portion of the information may be retrieved computationally, for example, from social media and/or other online information.

Then, data regarding the digital interaction behavior of the prospective client may be extracted. As for the characteristics, as least a portion of the data may be received along with the lead (for example, from a real-estate agent or agency), may be inputted by the prospective client him/herself, for example, in response to a questionnaire, a chat bot conversation and/or retrieved computationally, for example, from social media and/or other online information.

From the extracted data, at least one digital interaction behavior feature may be extracted. Preferably more than one and optionally a plurality of features (e.g. at least 4, 5, 10 or more features) are extracted. According to some embodiments, the features may be extracted from voice calls by applying voice analysis and/or speech recognition algorithms thereon. According to some embodiments, the features may be extracted from text (e.g. emails or text messages) by applying NLP models thereon. According to some embodiments, the features may be extracted from video communication (e.g. video calls) by applying image analysis algorithms thereon.

A machine learning algorithm may then be applied on the extracted digital interaction behavior features and on the one/or more characteristics obtained/retrieved for the prospective clients, to compute a probability of transaction for each of the client leads.

Figure 2A:
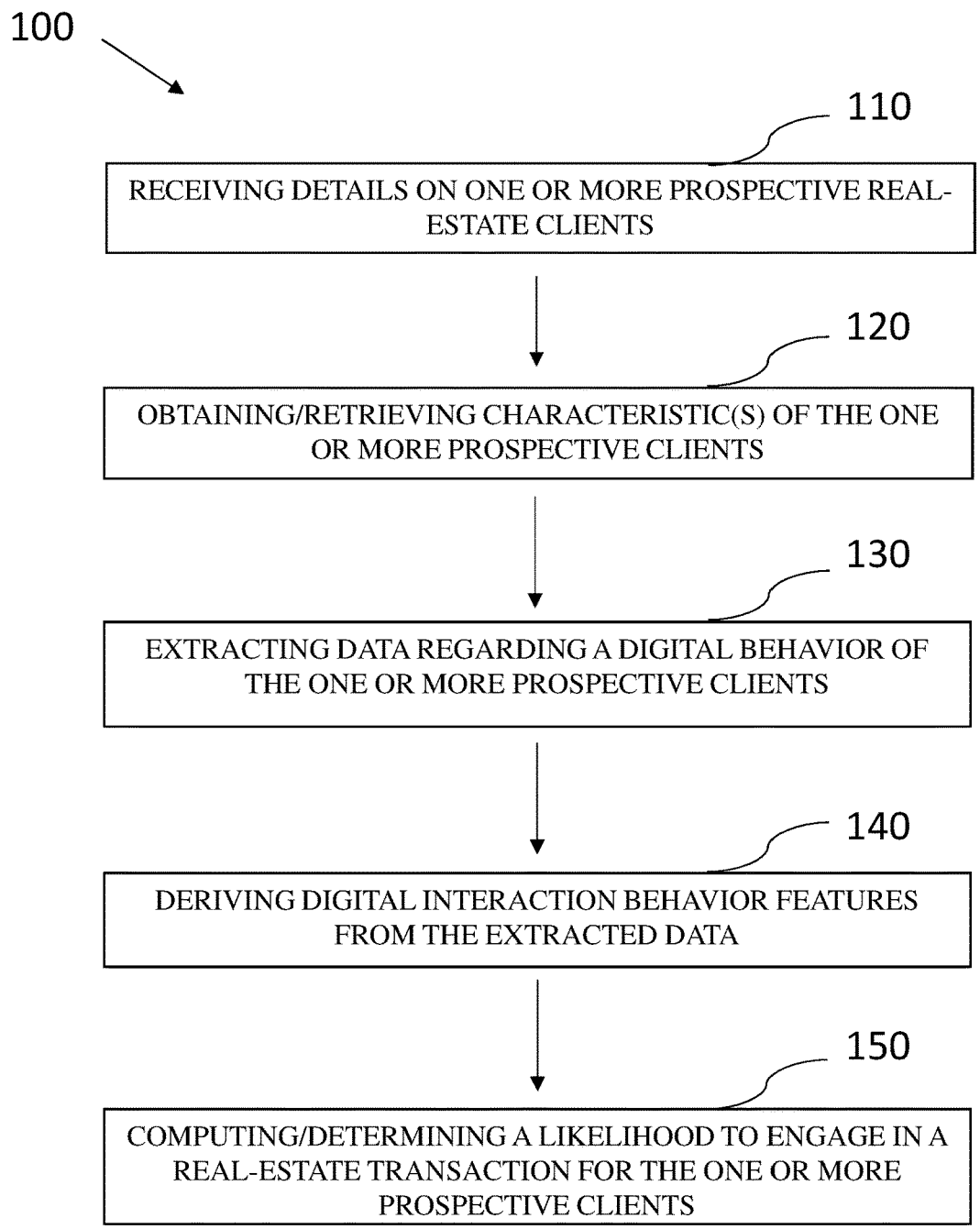
FIG. 2A is an exemplary flowchart of a computer implemented method for determining a transaction probability and/or engagement likelihood of prospective client(s), according to some embodiments.

Reference is now made to FIG. 2A, which is an exemplary flowchart of a computer implemented method 100 for determining a transaction probability of prospective client(s), according to some embodiments.

Method 100 may include a step 110 in which the processing unit obtains and/or retrieves a prospective client or more preferably a plurality of leads regarding prospective clients (such as 10, 20, 50, 100 or more leads). As stated herein, the leads may, for example, be obtained from a real-estate agent and/or retrieved from a dedicated real-estate website. The leads serve as an input to the platform.

In step 120, one or more characteristics of the prospective client(s) may then be obtained or retrieved. It is understood that at least a portion of the characteristics may be received along with the lead. Additionally or alternatively, at least a portion of the information may be provided by the prospective client him/herself, for example, in response to an online questionnaire, a chat bot conversation and/or the like. Additionally or alternatively, at least a portion of the information may be retrieved computationally, for example, from social media and/or other online information.

In addition, in step 130 data regarding the digital interaction behavior of the prospective client may be extracted. Again, at least a portion of the data may be received along with the lead (for example from a real-estate agent or agency), may be inputted by the prospective client him/herself, for example in response to a questionnaire, a chat bot conversation and/or retrieved computationally, for example, from social media and/or other online information, or be actively obtained in response to an initiated AI-mediated digital interaction. From the extracted data, features indicative of the digital interaction behavior of the prospective client(s) may be derived by applying various AI algorithms thereon, as essentially disclosed herein (step 140).

In step 150, a trained machine learning algorithm may be applied on the derived features and on the one or more obtained/retrieved characteristics of the prospective client(s), the output of which algorithm including a likelihood that the prospective client(s) will engage in a real-estate transaction.

According to some embodiments, the machine learning algorithm may be trained on an unsupervised dataset comprising a plurality of properties and their associated enriched data. The unsupervised machine learning discovers patterns and may cluster the data. According to some embodiments, the machine learning algorithm may be trained on a supervised dataset comprising a plurality of digital interaction behavior features and client characteristics of clients that either transacted or did not.

According to some embodiments, the output may be a text message, an icon, a color or other signal indicative of the probability. According to some embodiments, the output may be displayed on a display, such as a computer screen, or a smartphone. According to some embodiments, the output may be in the form of a document, including a list of prospective clients, classified and optionally ranked according to their determined likelihood to conduct a real-estate transaction. According to some embodiments, the output may be in the form of a shortlist, listing only the prospective clients with a high likelihood to transact (e.g. above average likelihood). According to some embodiments, the output may be user-modifiable, e.g. enable a user to filter, sort or otherwise present the output according to his/her preferences.

Figure 2B:
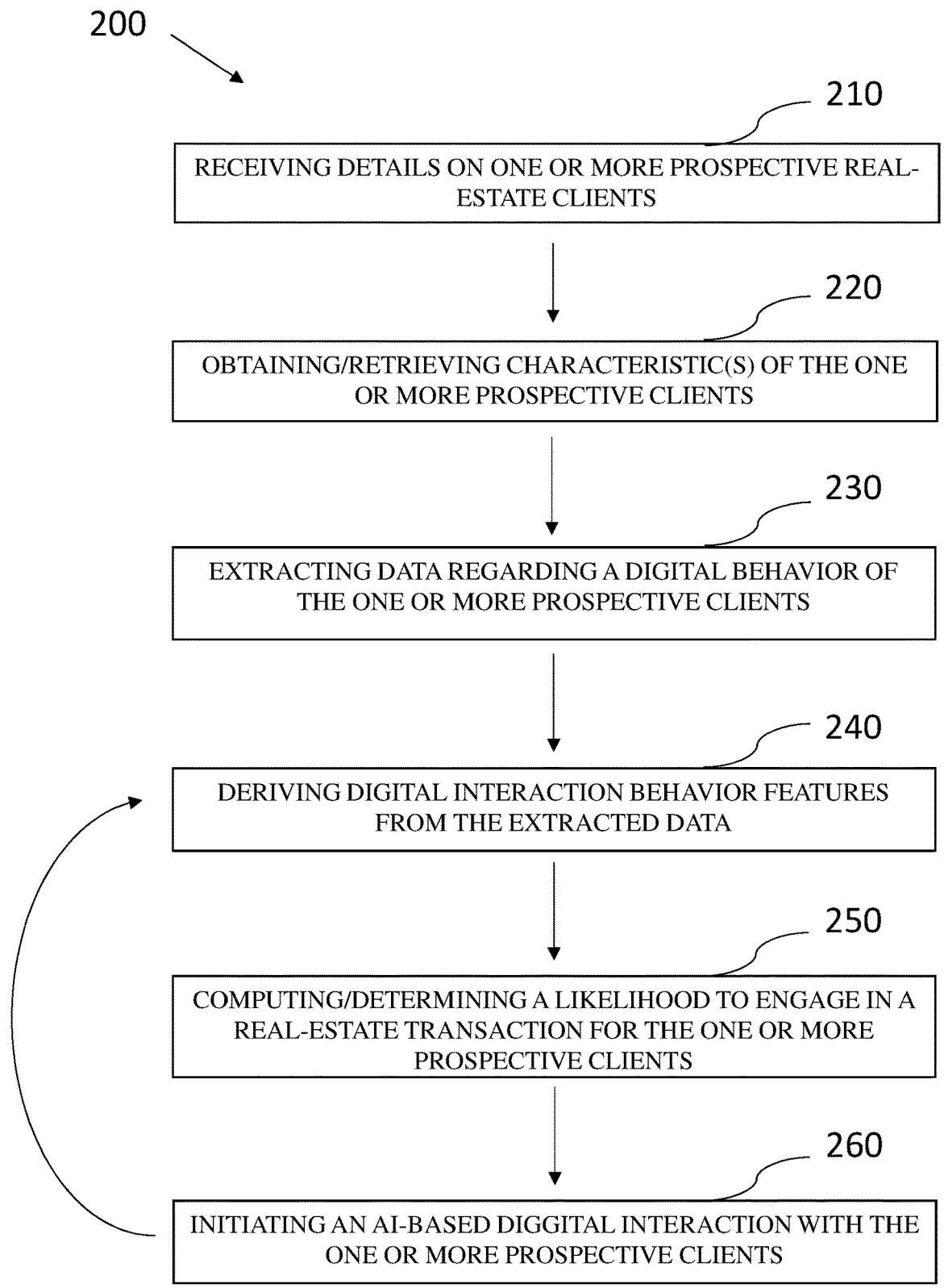
FIG. 2B is an exemplary flowchart of a computer implemented method for determining a transaction probability and/or engagement likelihood of prospective client(s) including a follow-up interaction, according to some embodiments.

Reference is now made to FIG. 2B, which is an exemplary flowchart of a computer implemented method 200 for determining a transaction probability of prospective client(s) including a follow-up interaction, according to some embodiments. Steps 210-250 are essentially similar to steps 110-150, respectively. In addition, method 200 includes an additional step 260 at which an AI-based digital follow-up interaction (such as a chat bot conversation, a text message or the like) is initiated with the one or more prospective clients. Features are then derived from the follow-up interaction and the probability of transaction recalculated by returning to steps 240 and 250.

Figure 2C:
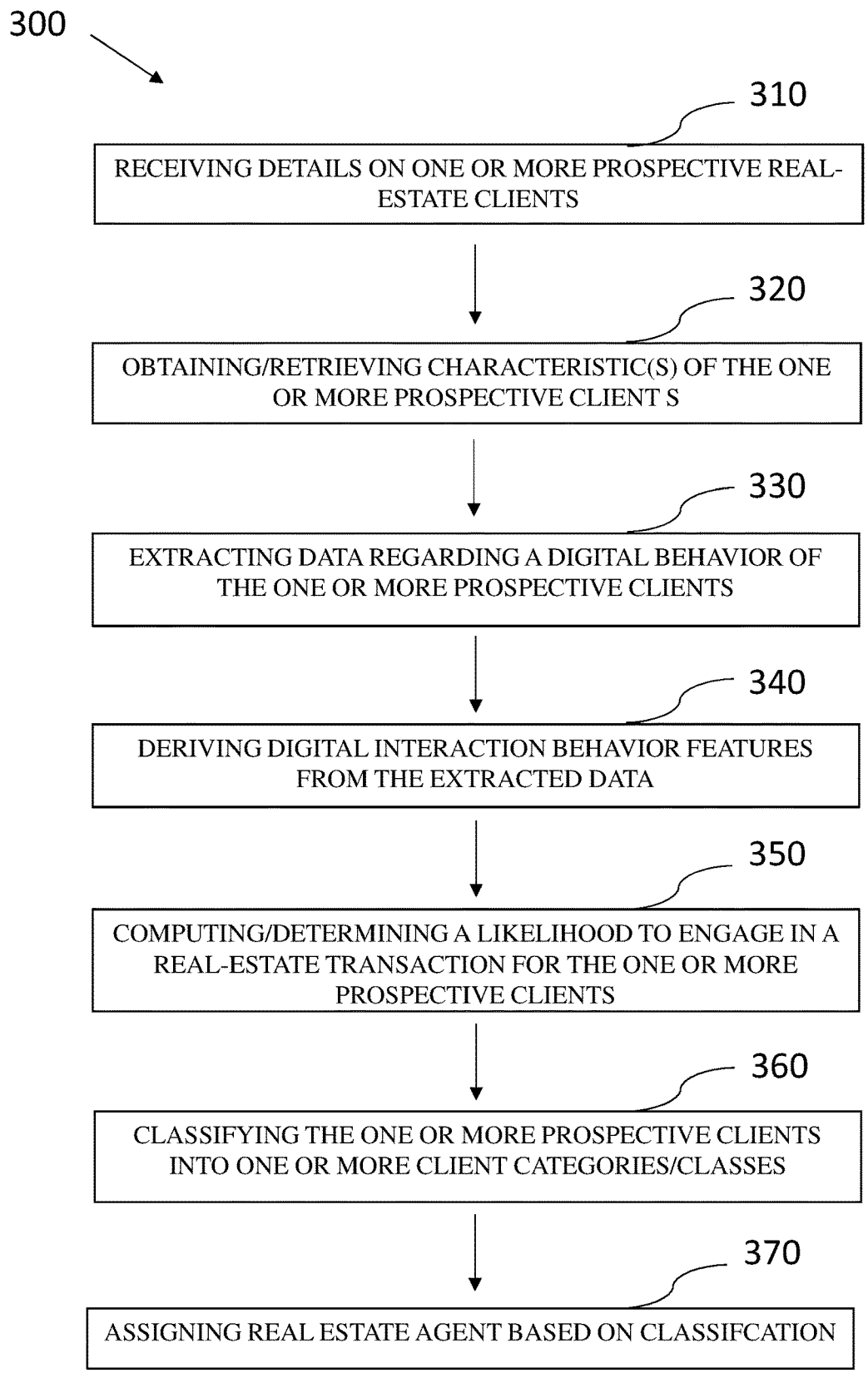
FIG. 2C is an exemplary flowchart of a computer implemented method for determining a transaction probability and/or engagement likelihood of prospective client(s) and for classifying the prospective client(s) into one or more client categories, according to some embodiments.

Reference is now made to FIG. 2C, which is an exemplary flowchart of a computer implemented method 300 for determining a transaction probability of prospective client(s) and for classifying the prospective client(s) into one or more client categories, according to some embodiments. Steps 310-350 are essentially similar to steps 110-150, respectively. In addition, method 300 includes an additional step 360 of classifying the prospective client(s) into one or more categories, as essentially described herein. Optionally, method 300 may further include a step 370 of assigning a specific real-estate agent (or agent type) to the prospective client(s) based on the classification.

In the description and claims of the application, the words "include" and "have", and forms thereof, are not limited to members in a list with which the words may be associated.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods according to some embodiments may be described in a specific sequence, methods of the disclosure may include some or all of the described stages carried out in a different order. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, for example, JavaScript, Smalltalk, C, C++, TypeScript, Python and R.

The computer readable program instructions may execute entirely on the user's computer, partly on the user's computer, as a stand-alone software package, partly on the user's computer and partly on a remote computer or entirely on the remote computer or server. In the latter scenario, the remote computer (or cloud) may be connected to the user's computer through any type of network, including a local area network (LAN) or a wide area network (WAN), or the connection may be made to an external computer (for example, through the Internet using an Internet Service Provider) including wired or wireless connection (such as, for example, Wi-Fi, BT, mobile, and the like). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While certain embodiments of the invention have been illustrated and described, it will be clear that the invention is not limited to the embodiments described herein. Numerous modifications, changes, variations, substitutions and equivalents will be apparent to those skilled in the art without departing from the spirit and scope of the present invention as described by the claims, which follow.

The invention claimed is:

1. A computer implemented method executed on a processor for determining a likelihood of a prospective client to engage in a real estate transaction selected from a group consisting of buying/selling of a property, renting/leasing a property and/or financing a property, the computer implemented method comprising:
   obtaining and/or identifying a prospective client;
   obtaining and/or retrieving one or more characteristics of the prospective client;
   extracting data regarding a digital interaction behavior of the prospective client, the digital interaction comprising browsing, texting, voice messaging, image messaging, multimedia messaging, bot conversations, comments and/or responses to checked property listings, video clips watching, voice calls, video calls or any combination thereof, and the extracting comprising applying voice analysis, text analysis, voice to text transcription and analysis thereof, sentiment analysis or any combination thereof;
   deriving from the retrieved/extracted data one or more digital interaction features of the prospective client, said one or more digital interaction features is directly or indirectly associated with real estate;
   applying a machine learning algorithm on the derived one or more digital interaction features and on the prospective client's characteristics to determine a probability, a range of probabilities or a category of likelihood of the prospective client to engage in the real-estate transaction,
   wherein the machine learning algorithm is trained using a training dataset comprising digital interaction features and user characteristics of a population of prospective clients and labels associated with each member of the population, the labels indicating whether the member engaged in a transaction; and
   providing an output indicative of the determined probability, range of probabilities or category of likelihood of the prospective client to engage in the real-estate transaction, thereby allowing a user to determine whether to engage with the prospective client based upon the output.

2. The method of claim 1, engaging in the real-estate transaction comprises conducting the real-estate transaction.

3. The method of claim 1, further comprising calculating the likelihood to engage in the transaction at a certain point in time or to calculate the point in time when a specific likelihood to engage in the real-estate transaction is reached.

4. The method of claim 1, wherein the prospective client is a subject visiting, entering and/or communicating with a virtual real estate platform.

5. The method of claim 1, further comprising initiating an interaction with the prospective client and wherein the obtaining and/or retrieving data regarding the digital interaction behavior of the prospective client comprises extracting the data regarding the digital interaction behavior from the initiated interaction.

6. The method of claim 1, further comprising periodically interacting with the prospective client and updating the extracted data based on periodic interaction.

7. The method of claim 1, further comprising assigning to the prospective client one or more clusters created by a machine learning algorithm trained on the full population and on digital behaviors thereof.

8. The method of claim 1, using the correlations in a regression-based determination to predict for the particular prospective client the probability, the range of probabilities or the category of likelihood, of the particular prospective client engaging in the real-estate transaction.

9. The method of claim 1, wherein the one or more characteristics of the prospective client comprise at least one of the following:
   a. one or more life circumstances driving the decision to visit/enter the virtual real estate platform,
   b. age,
   c. gender/affiliation,
   d. family status,
   e. employment status,
   f. socioeconomic status,
   g. current housing status,
   h. geographic location,
   i. demographic status,
   j. mortgage pre-approval,
   k. financial status,
   l. financial proof provided, and
   m. previous transactions.

10. The method of claim 1, further comprising matching an agency or agent to the prospective client, based on the probability, the range of probabilities or the category of likelihood, and on a type of the client, and assigning a particular agent to the prospective client based on the derived one or more digital interaction features and/or on the probability, the range of probabilities or the category of likelihood of the prospective client to engage in the real-estate transaction.

11. The method of claim 1, further comprising predicting the likelihood of the prospective client to acquire a real-estate related service, the service selected from legal service, insurance, renovation moving, loan, mortgage, title escrow or any combination thereof.

12. The method of claim 1, further comprising predicting a suitable timing of a next interaction with the prospective client, based on the derived one or more digital interaction features and/or on the probability, the range of probabilities or the category of likelihood of the prospective client to engage in the real-estate transaction.

13. The method of claim 1, wherein the output may be in the form of a shortlist, listing only the prospective clients with a high likelihood to transact.

14. The method of claim 1, wherein the computer implemented method and/or platform is further configured to classify the prospective client into one or more client classes/types/categories by applying a same or a different machine-learning algorithm on the derived features.

15. The method of claim 1, wherein the computer implemented method and/or platform is further configured to determine the likelihood that the prospective client will acquire a real-estate related service.

16. The method of claim 1, wherein the output may be a text message, an icon, a color or other signal indicative of the probability.

17. The method of claim 1, the output may be displayed on a display, such as a computer screen, or a smartphone.

18. The method of claim 1, the output may be in the form of a document, including a list of prospective clients, classified and optionally ranked according to their determined likelihood to conduct a real-estate transaction.

19. The method of claim 1, further comprising updating the likelihood of the prospective client to transact, based on the follow-up digital interaction.

20. The method of claim 1, determining the probability, range of probabilities or category of likelihood of the prospective client to engage in the real-estate transaction comprises determining the likelihood of the prospective client to engage in the real-estate transaction in a predetermined time-frame.

21. A system for determining a likelihood of a prospective client to engage in a real estate transaction selected from a group consisting of buying/selling of a property, renting/leasing a property and/or financing a property, the system comprising
 a non-transitory memory device, wherein modules of instruction code are stored, and at least one processor associated with the memory device, and configured to execute the modules of instruction code, whereupon execution of said modules of instruction code, the at least one processor is configured to:
  obtain and/or identify a prospective client;
  obtain and/or retrieve one or more characteristics of the prospective client;
  extract data regarding a digital interaction behavior of the prospective client, the digital interaction comprises browsing, texting, voice messaging, image messaging, multimedia messaging, bot conversations, comments and/or responses to checked property listings, video clips watching, voice calls, video calls or any combination thereof, and the extracting comprising applying voice analysis, text analysis, voice to text transcription and analysis thereof, sentiment analysis or any combination thereof;
  derive from the retrieved/extracted data one or more digital interaction features of the prospective client, the one or more digital interaction features is directly or indirectly associated with real estate;
  apply a machine learning algorithm on the derived one or more digital interaction features and on the prospective client's characteristics to determine a probability, a range of probabilities or a category of likelihood of the prospective client to ultimately transact, wherein the machine learning algorithm is trained using a training dataset comprising digital interaction features and user characteristics of a population of prospective clients and labels associated with each member of the population, the labels indicating whether the member engaged in the real-estate transaction; and
  provide an output indicative of the determined probability, range of probabilities or category of likelihood of the prospective client to engage in the real-estate transaction.

22. A computer implemented method executed on a processor for determining a likelihood of a prospective client to engage in a real estate transaction selected from a group consisting of buying/selling of a property, renting/leasing a property and/or financing a property, the computer implemented method comprising:
 obtaining and/or identifying a prospective client;
 obtaining and/or retrieving one or more characteristics of the prospective client;
 extracting data regarding a digital interaction behavior of the prospective client,
 deriving from the retrieved/extracted data one or more digital interaction features of the prospective client, said one or more digital interaction features is directly or indirectly associated with real estate, wherein the at least one digital interaction feature is selected from an amount of time spent browsing, a degree to which the browsing was an in-depth browsing, a quantity of property listings checked, a degree of similarity between the properties checked, a degree of consistency between the property listings checked and a set of preferences investigated by the prospective client, a level of responsiveness by the prospective client to conversational bots, text/multimedia/voice messages, voice calls and/or push notifications, a timing of the prospective client's response to conversational bots, text/multimedia/voice messages, voice calls and/or push notifications a listing checking rate, a realistic expectations index, a level of action-taking related to a potential real estate transaction, an amount of people involved by the prospective client with regards to the property listing, an amount of sharing of the checked property listing or any combination thereof;
 applying a machine learning algorithm on the derived one or more digital interaction features and on the prospective client's characteristics to determine a probability, a range of probabilities or a category of likelihood of the prospective client to engage in the real-estate transaction,
 wherein the machine learning algorithm is trained using a training dataset comprising digital interaction features and user characteristics of a population of prospective clients and labels associated with each member of the population, the labels indicating whether the member engaged in a transaction; and
 providing an output indicative of the determined probability, range of probabilities or category of likelihood of the prospective client to engage in the real-estate transaction, thereby allowing a user to determine whether to engage with the prospective client based upon the output.

\* \* \* \* \*